J. L. ACKERMAN.
GLARE SHIELD.
APPLICATION FILED OCT. 21, 1915.
1,202,765.
Patented Oct. 24, 1916.
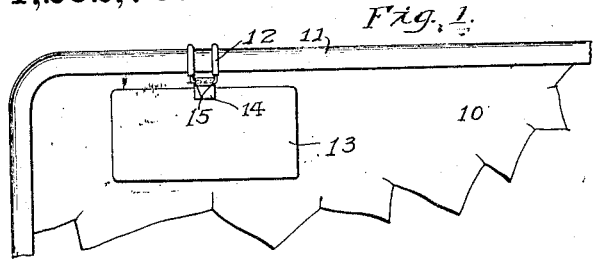
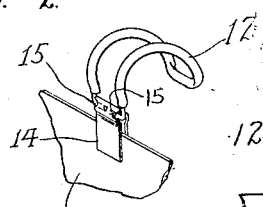
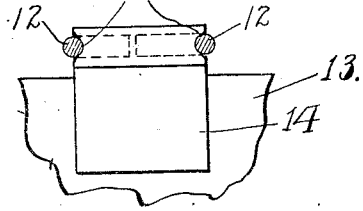
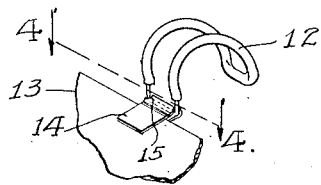
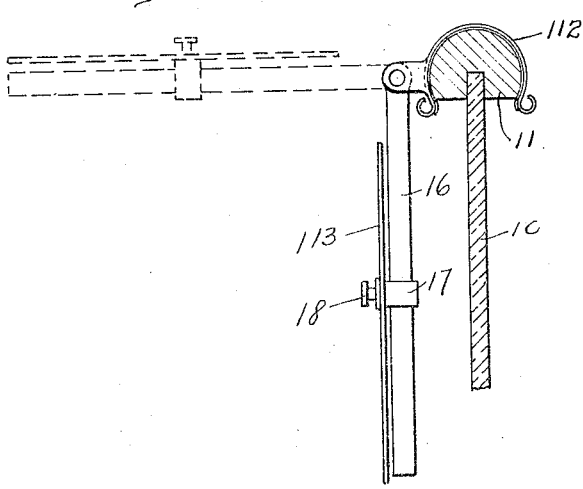
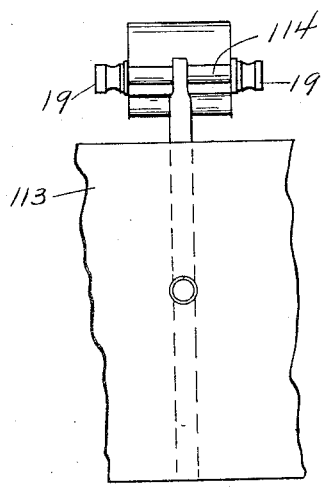
WITNESSES:
J H Swan
G. H. Wells.
INVENTOR
Jasper L. Ackerman.
BY
Lockwood & Lockwood
ATTORNEYS.

UNITED STATES PATENT OFFICE.

JASPER L. ACKERMAN, OF MONTICELLO, INDIANA.

GLARE-SHIELD.

1,202,765.  Specification of Letters Patent.  Patented Oct. 24, 1916.

Application filed October 21, 1915. Serial No. 57,061.

*To all whom it may concern:*

Be it known that I, JASPER L. ACKERMAN, a citizen of the United States, and a resident of Monticello, county of White, and State of Indiana, have invented a certain new and useful Glare-Shield; and I do hereby declare that the following is a full, clear, and exact description thereof, reference being had to the accompanying drawings, in which like letters refer to like parts.

The object of this invention is to shield the driver of an automobile from the glare of the headlights of an approaching automobile in front, in order to avoid blinding the driver.

It is well known that the glare of headlights blinds the eyes of automobile drivers so that they cannot see the roadway or the approaching automobiles distinctly or accurately, with the result that a great many collisions are caused from this trouble; and it also causes drivers of automobiles a great deal of annoyance and fear in knowing just how close they are running to the edge of the road or to an approaching automobile.

The chief feature of the invention consists of combining with the wind-shield of an automobile at a point in front of the driver, a shade or shield readily movable by the driver to a position to shade his eyes from the glare in front of his automobile, and readily movable out of the way after the approaching automobile is past. Such shade or shield is intended, while protecting the eyes of the driver from the glare of the lamps in front, to enable the major portion of the roadway to be visible to the driver so that he can drive safely. In other words, the shade or shield hides only the lamps on the approaching automobile, but does not hide the roadway between the two automobiles or at the side of the approaching automobile. The lights on the approaching automobile will make the roadway all the more distinct if the eyes can be shaded merely from the lamps. Most of the roadway will be visible to the driver under and at the sides of the shade or shield, depending upon his adjustment thereof.

The full nature of the invention will be understood from the accompanying drawings and the following description and claims:

In the drawings Figure 1 is a front elevation of a portion of an automobile windshield showing the glare shade secured thereto in its lowered position. Fig. 2 is a perspective view of the means for attaching the glare shade to the wind-shield with the glare shade in its lowered position. Fig. 3 is the same as Fig. 2 with the glare shade in elevated position. Fig. 4 is an enlarged section taken on the line 4—4 of Fig. 3. Fig. 5 is a side elevation of a modified form of the glare shade, showing it in lowered and raised positions. Fig. 6 is a front elevation of a portion of the glare shade and means for securing it to the wind-shield.

There is shown herein a wind-shield 10 of an automobile, having an upper metallic rim portion 11 to which removable spring clamps 12 are secured, whereby the glare shade is mounted. The glare shade consists of a plate 13, made preferably of metal or other non-transparent material, and is about six inches long and three inches wide. Secured to the upper side of said shade there is a hinge member 14 through which the ends of the clamp 12 are adapted to extend so that the hinge member will be movable thereon. On each side of said hinge member there are notches 15 so placed thereon that the clamps 12 will be engaged therein when the shield is raised to a horizontal position, thereby holding the shield in that position so as not to be in the way of the view of the driver. The clamps 12 are preferably made of spring wire so that they will pinch against the hinge member and hold it in its lowered position by gravity and friction when it is desired to be used. It may then be raised to a horizontal position so that the spring clamps will engage the notches and hold it out of the way of the driver.

Figs. 5 and 6 show a modified form of the glare shade, having a spring clamp 112 and a rod 16 on which the glare shade 113 is slidably secured by means of a collar 17 and thumb screw 18, so that said shield may be adjusted longitudinally thereon. Said rod 16 is adjustably secured to the spring clamp 112 by means of the hinge member 114 and is frictionally adjustable thereon by means of the set screws 19.

The device is employed as follows: Ordinarily the shade is in its raised position, as shown in Fig. 3 and by dotted lines in Fig. 5, so that it does not obstruct the view of the driver. When, however, a car is approaching with headlights shining, the shade 13 is pulled down into position to cut out the glare of the lamps from the driver's eyes. But he can see under and around the shade, simply keeping it between him and the aproaching headlights. When the car has passed, the driver may then raise the shield to its normal and horizontal position, where it will be held by means of the spring clamps engaging the notches in the hinged member.

The invention claimed is:

The combination with an automobile wind shield, with a glare shade including a spring wire clamping member adapted to grip said wind shield having its two ends turned inwardly toward each other, and a hinge member on said shade through which the ends of said clamping member are adapted to extend, having notches therein for engaging said clamping member so as to hold the shade in the desired position.

In witness whereof, I have hereunto affixed my signature in the presence of the witnesses herein named.

JASPER L. ACKERMAN.

Witnesses:
  W. P. COOPER,
  W. S. BUSHNELL.